United States Patent
Forghani-zadeh et al.

(10) Patent No.: US 9,268,350 B2
(45) Date of Patent: Feb. 23, 2016

(54) POWER MANAGEMENT APPARATUS WITH RAPID SHORT RESPONSE AND FULL LOAD RECOVERY

(71) Applicant: Texas Instruments Incorporated, Dallas, TX (US)

(72) Inventors: H. Pooya Forghani-zadeh, Allen, TX (US); Vikrant Dhamdhere, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 254 days.

(21) Appl. No.: 13/962,778

(22) Filed: Aug. 8, 2013

(65) Prior Publication Data
US 2015/0042302 A1    Feb. 12, 2015

(51) Int. Cl.
*H02M 3/156*    (2006.01)
*G05F 1/573*    (2006.01)
*H02H 9/02*    (2006.01)

(52) U.S. Cl.
CPC ............... *G05F 1/573* (2013.01); *H02H 9/025* (2013.01)

(58) Field of Classification Search
CPC ...................................................... H02M 3/156
See application file for complete search history.

(56) References Cited

U.S. PATENT DOCUMENTS

| | | | | |
|---|---|---|---|---|
| 6,140,806 A * | 10/2000 | Gohara | | 323/282 |
| 6,624,994 B1 * | 9/2003 | Schmoock et al. | | 361/93.1 |
| 2008/0061758 A1 * | 3/2008 | Nishida | | 323/284 |
| 2013/0069612 A1 * | 3/2013 | Feldtkeller | | 323/284 |
| 2013/0221941 A1 * | 8/2013 | Rozman et al. | | 323/282 |

* cited by examiner

*Primary Examiner* — Emily P Pham
(74) *Attorney, Agent, or Firm* — Lawrence J. Bassuk; Frank D. Cimino

(57) ABSTRACT

A voltage feedback loop employed with a power distribution switch rapidly responds to a predetermined drop in output voltage to increase the resistance of the switch for a predetermined time. After this predetermined time, a current feedback loop controls the resistance until the output voltage recovers, while also isolating the voltage feedback loop from the switch.

19 Claims, 1 Drawing Sheet

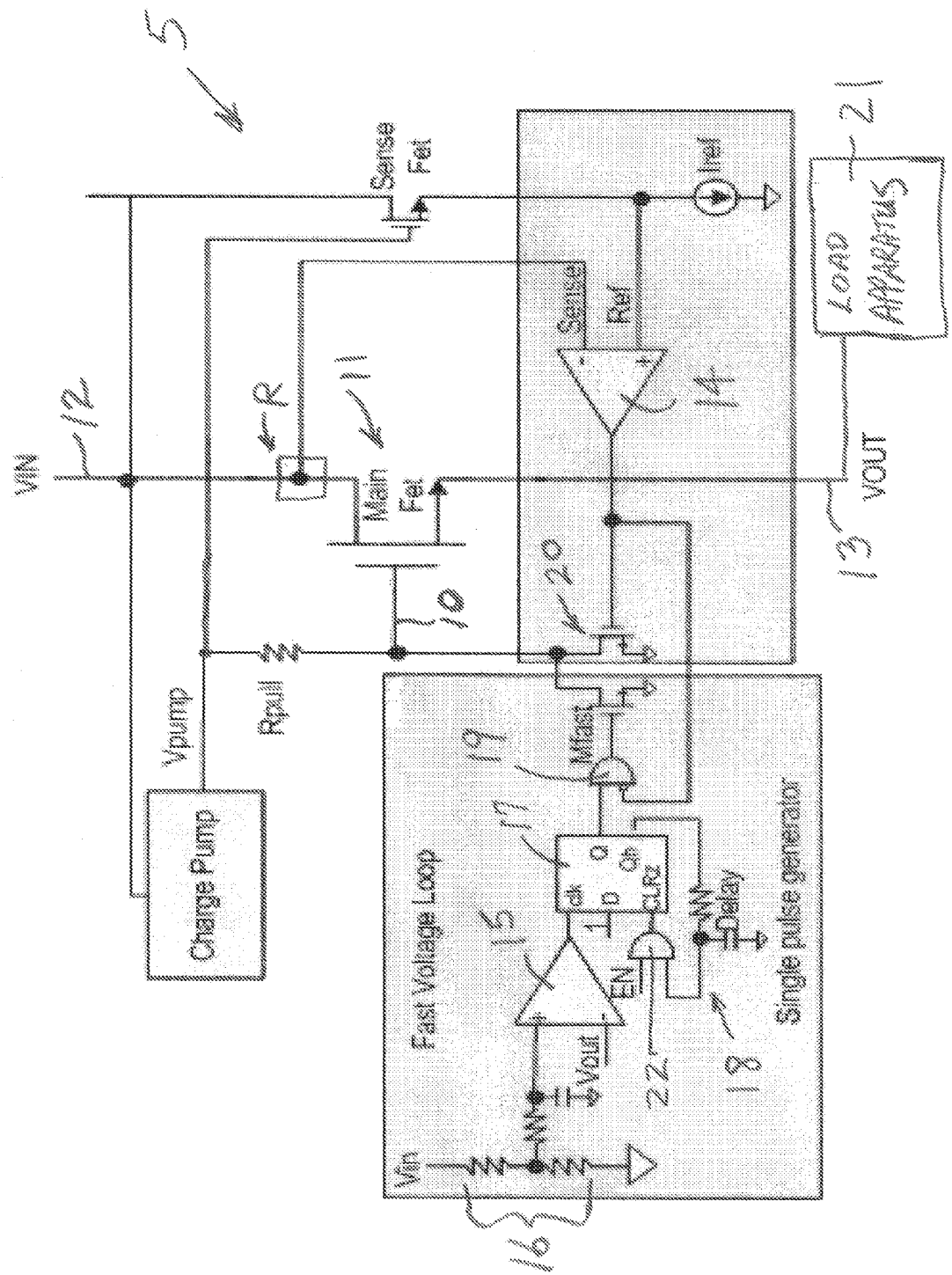

POWER MANAGEMENT APPARATUS WITH RAPID SHORT RESPONSE AND FULL LOAD RECOVERY

FIELD

The present work relates generally to power distribution switches and, more particularly, to hard short response in a power distribution switch.

BACKGROUND

Power distribution switches are used in power management integrated circuits to distribute power to subsystems. In one example, power distribution switches are used to limit the current flowing to an output device. For example, in a computer system a power distribution switch may couple a power source to an output terminal, thereby supplying power to an attached device. Some devices are limited to 0.5 amperes (A) of current for extended periods, but the devices may occasionally draw more current than this limit. If a device overdraws current for too long, the power distribution switch may increase its resistance, thereby reducing the current draw and preventing the device from significantly affecting the voltage level of the power source.

Conventional power distribution switches include analog feedback loops to monitor the input to the power distribution switch for excessive current draw by a device drawing power from the output. In an example, a sense resistor is placed in series with the current supply to generate a sense voltage that is compared to a desired reference voltage at an amplifier. In such arrangements, the output of the amplifier controls the power distribution switch coupling the power source to the output terminal, and increases the resistance of the switch if the sense voltage indicates that too much current is being drawn. However, in the case of a hard short circuit condition (e.g., a condition in which the resistance between an output terminal of the power distribution switch and ground drops to roughly 0.1 ohms), large currents may flow through the power distribution switch before the feedback loop can respond to increase resistance of the power distribution switch. This condition may be damaging to the power distribution switch, or may lead to a situation in which the power source voltage is pulled below tolerable levels.

One conventional approach, described in U.S. Pat. No. 7,817,393 (incorporated by reference herein in its entirety), addresses the undesired slow response to hard short by adding a digital voltage feedback loop that responds to the hard short more rapidly than the analog feedback loop. In response to detection of a hard short, the digital loop disables, and/or increases the resistance of, one or more conduction paths in the power distribution switch, thereby increasing its series resistance. For example, if the current limit of the switch is set to 1 A, the digital loop may rapidly disable 4/5 of the conduction paths, thereby limiting the current to 200 mA. This condition persists until the output terminal voltage recovers from the hard short. However, in some situations, the load device attached to the output terminal may require full current (e.g., significantly more than 200 mA) for start up, such that the output terminal voltage cannot recover while the 200 mA current limit condition persists.

It is desirable in view of the foregoing to provide for rapid current limit protection against shorts without requiring the output terminal voltage to recover before the current limit condition can be removed.

BRIEF DESCRIPTION OF THE DRAWINGS

FIG. 1 diagrammatically illustrates a system including a power management apparatus according to example embodiments of the present work.

DETAILED DESCRIPTION

Example embodiments of the present work provide a power management apparatus having a voltage feedback loop that rapidly responds to a predetermined drop in output voltage to increase the resistance of a power distribution switch for a predetermined time, after which a current feedback loop controls the resistance until the output voltage recovers, while also isolating the voltage feedback loop from the switch. The current limit condition imposed by the voltage feedback loop therefore does not persist until the output voltage recovers, in contrast to the aforementioned prior art arrangement. Rather, the current feedback loop regulates the switch current back to a full load condition, which permits the output voltage to recover at full current load, in contrast to the prior art.

FIG. 1 diagrammatically illustrates a system (e.g., a computer system) including a power management apparatus 5 coupled to a load apparatus 21 (e.g., a computer apparatus) according to example embodiments of the present work. The power management apparatus 5 includes a power distribution switch (switching device) 11 that provides a series resistance between a power source terminal 12 at an input voltage Vin and an output terminal 13 at an output voltage Vout. As shown in FIG. 1, the switching device 11 is, in some embodiments, an FET whose drain and source are respectively coupled to the power source terminal 12 and the output terminal 13, and whose gate 10 is coupled, via a resistance Rpull, to an output voltage (Vpump) of a charge pump. Such arrangement of a power distribution switch is known in the art.

The power management apparatus 5 further includes a current feedback loop that monitors current through the switching device 11. The current feedback loop includes a voltage comparator 14 having a positive input held at a reference voltage level Ref that is generated in conventional fashion by a reference current source Iref and a reference resistance (realized by a sense FET in FIG. 1) connected between the power source terminal 12 and the reference current source Iref. A negative input of comparator 14 receives a sense voltage level Sense that corresponds to the current through switching device 11. The Sense voltage is obtained in conventional fashion from a sense resistance R connected between the power source terminal 12 and the switching device 11. The current feedback loop thus monitors the switch current (current through switching device 11) relative to the reference current Iref in conventional fashion.

The output of comparator 14 controls the gate of an FET switch 20 whose source is grounded and whose drain is connected to the gate 10 of switching device 11. If the switch current increases beyond a limit set by Iref (such as would occur if the output terminal 13 is shorted to ground), the voltage Sense drops below the voltage Ref, driving the output of comparator 14 active high to turn on the switch 20 and pull down the gate 10 of switching device 11. This increases the resistance presented by switching device 11, thereby limiting the switch current. Under tolerable switch current conditions, the output of comparator 14 remains inactive low, keeping the switch 20 off.

The power management apparatus 5 further includes a voltage feedback loop (Fast Voltage Loop) that monitors the output voltage Vout. The voltage feedback loop includes a voltage comparator 15 that compares Vout, at its negative input, with a reference voltage at its positive input that is a predetermined fraction of the input voltage Vin. In conventional fashion, a resistor voltage divider 16 sets the reference voltage for the positive input of comparator 15. An RC filter is provided between the divider 16 and the comparator 15, as is also conventional. As is known in the art, this conventional output voltage monitoring responds to a hard short condition at the output terminal 13 more rapidly than the conventional current monitoring performed by the above-described current feedback loop.

The output of comparator 15 drives the clock input of a DQ flip-flop 17 whose D input is held at logic 1. The Q output drives an input of AND gate 19, whose other input is driven by the inverted output of the comparator 14. The inverted Q output, designated Qb, is fed back, through an RC delay loop 18 that includes an AND gate 22, to control the clear input CLRz of the flip-flop 17. This feedback-delay loop 18 permits the flip-flop to clear itself, as described in more detail below.

When the output voltage Vout falls below the reference voltage level provided by voltage divider 16 (e.g., below 85% of Vin in some embodiments), the output of comparator 15 goes high, and clocks logic 1 to the Q output of flip-flop 17. With the output of comparator 14 (in the slower current feedback loop) still low, the Q output is qualified at AND gate 19, taking the gate of FET switch Mfast high. The switch Mfast is connected in parallel with aforementioned switch 20. When the gate of Mfast goes high, this pulls down the voltage on the gate 10 of switching device 11, thereby increasing its resistance to limit the current. The feedback-delay loop 18 ensures that the Q output of flip-flop 17 is high for only a limited time, which is determined by the RC time constant of the loop. The low output from Qb is delayed due to the RC time constant of loop 18, and then, if qualified by signal EN at AND gate 22, clears the flip-flop 17 via AND gate 22 and the (active low) CLRz input of the flip-flop. Thus, the flip-flop 17 and feedback-delay loop 18 form a digital pulse generator, and the Q output provides a digital pulse whose width is determined by the RC time constant of loop 18. In various example embodiments, the pulse width has various values in a range of 2-20 microseconds.

When digital the pulse ends, the switch Mfast turns off, so current limiting by the voltage feedback loop ends. From this point, the gate 10 of the switching device 11 is controlled by comparator 14 via a switch 20 as described above. While the output of comparator 14 is actively regulating current through switching device 11 via switch 20, the Q output of flip-flop 17 is isolated from switch Mfast (via AND gate 19). The voltage feedback loop cannot affect the switching device 11 again until the output voltage Vout recovers, which causes the output of comparator 14 to re-assume its inactive low state.

Although example embodiments of the present work have been described above in detail, this does not limit the scope of the work, which can be practiced in a variety of embodiments.

What is claimed is:

1. A power management apparatus, comprising:
   a switching device that provides a resistance between a power source terminal and an output terminal, said power source terminal having an input voltage, and said output terminal having an output voltage; and
   a voltage feedback loop coupled to said switching device and said output terminal, said voltage feedback loop configured to monitor said output voltage and selectively control said switching device based on said output voltage to increase said resistance for a predetermined time duration,
   wherein said voltage feedback loop is configured to selectively generate a digital pulse of said predetermined time duration based on said output voltage, and wherein said resistance increases in response to said digital pulse.

2. The apparatus of claim 1, wherein said voltage feedback loop includes a voltage comparator that monitors said output voltage relative to said input voltage, and a pulse generator coupled to said voltage comparator for generating said digital pulse in response to a predetermined decrease in said output voltage relative to said input voltage.

3. The apparatus of claim 2, wherein said pulse generator includes a flip-flop and a delay loop coupled to said flip-flop.

4. The apparatus of claim 1, including a current feedback loop coupled to said power source terminal and said switching device, said current feedback loop configured to monitor a current through said switching device and selectively adjust said resistance based on said current.

5. The apparatus of claim 4, wherein said voltage feedback loop generates said digital pulse in response to a short at said output terminal, and wherein, after said predetermined time duration of said digital pulse, said current feedback loop controls said resistance until said output voltage recovers from said short while also keeping said voltage feedback loop isolated from said switching device.

6. The apparatus of claim 5, including logic coupled to said voltage feedback loop and said current feedback loop and said switching device for permitting said current feedback loop to isolate said voltage feedback loop from said switching device.

7. The apparatus of claim 5, including a first switch coupled to said current feedback loop and a control input of said switching device, and a second switch coupled to said voltage feedback loop and said control input of said switching device, wherein said first and second switches are connected in parallel with one another, and wherein said first and second switches have respective control inputs that are respectively coupled to said current feedback loop and said voltage feedback loop.

8. The apparatus of claim 7, wherein said voltage feedback loop includes a voltage comparator that monitors said output voltage relative to said input voltage, and a pulse generator coupled to said voltage comparator for generating said digital pulse in response to a predetermined decrease in said output voltage relative to said input voltage, and wherein said pulse generator is coupled to said control input of said second switch to permit said digital pulse to increase said resistance by controlling said second switch.

9. The apparatus of claim 7, including logic coupled between said voltage feedback loop and said control input of said second switch, wherein said current feedback loop is coupled to said logic and selectively controls said logic to isolate said voltage feedback loop from said second switch.

10. The apparatus of claim 5, wherein said voltage feedback loop includes a voltage comparator that monitors said output voltage relative to said input voltage, and a pulse generator coupled to said voltage comparator for generating said digital pulse in response to a predetermined decrease in said output voltage relative to said input voltage.

11. A power management apparatus, comprising:
    a switching device that provides a resistance between a power source terminal and an output terminal, said power source terminal having an input voltage, and said output terminal having an output voltage;
    first and second switches coupled to a control input of said switching device and connected in parallel with one another;
    a voltage feedback loop coupled to said output terminal and configured to monitor said output voltage, said voltage feedback loop coupled to a control input of said first switch to permit said voltage feedback loop to selectively adjust said resistance by controlling said first switch based on said output voltage; and a current feedback loop coupled to said power source terminal and configured to monitor a current through said switching device, said current feedback loop coupled to a control input of said second switch to permit said current feedback loop to selectively adjust said resistance by controlling said second switch based on said current.

12. The apparatus of claim 11, wherein said voltage feedback loop is configured to selectively apply a digital pulse of predetermined time duration to said control input of said first switch based on said output voltage, and wherein said resistance increases in response to said pulse.

13. The apparatus of claim 12, wherein said voltage feedback loop generates said digital pulse in response to a short at said output terminal, and wherein, after said predetermined time duration of said digital pulse, said current feedback loop controls said resistance until said output voltage recovers from said short while also keeping said voltage feedback loop isolated from said switching device.

14. The apparatus of claim 13, including logic coupled to said current feedback loop and said voltage feedback loop and said control input of said first switch for permitting said current feedback loop to isolate said voltage feedback loop from said first switch.

15. A power management apparatus, comprising:
a switching device that provides a resistance between a power source terminal and an output terminal, said power source terminal having an input voltage, and said output terminal having an output voltage;
a voltage feedback loop coupled to said output terminal and configured to monitor said output voltage, said voltage feedback loop coupled to said switching device and configured to selectively adjust said resistance based on said output voltage;
a current feedback loop coupled to said power source terminal and configured to monitor a current through said switching device, said current feedback loop coupled to said switching device and configured to selectively adjust said resistance based on said current; and
logic coupled to said current feedback loop, said voltage feedback loop and said switching device, wherein said current feedback loop is configured to selectively isolate said voltage feedback loop from said switching device by controlling said logic.

16. The apparatus of claim 15, wherein said voltage feedback loop is configured to selectively generate a digital pulse of predetermined time duration based on said output voltage, and wherein said resistance increases in response to said digital pulse.

17. A power management apparatus, comprising:
a switching device that provides a resistance between a power source terminal and an output terminal, said power source terminal having an input voltage, and said output terminal having an output voltage;
first and second switches coupled to a control input of said switching device and connected in parallel with one another;
a voltage feedback loop coupled to said output terminal and configured to monitor said output voltage, said voltage feedback loop coupled to a control input of said first switch to permit said voltage feedback loop to selectively adjust said resistance by controlling said first switch based on said output voltage;
a current feedback loop coupled to said power source terminal and configured to monitor a current through said switching device, said current feedback loop coupled to a control input of said second switch to permit said current feedback loop to selectively adjust said resistance by controlling said second switch based on said current;
wherein said voltage feedback loop is configured to selectively apply a digital pulse of predetermined time duration to said control input of said first switch based on said output voltage, and wherein said resistance increases in response to said pulse;
wherein said voltage feedback loop generates said digital pulse in response to a short at said output terminal, and wherein, after said predetermined time duration of said digital pulse, said current feedback loop controls said resistance until said output voltage recovers from said short while also keeping said voltage feedback loop isolated from said switching device;
wherein said current feedback loop includes a first comparator that receives a sense voltage input corresponding to said current, and a reference voltage input corresponding to a reference current, and wherein said first comparator has an output coupled to said control input of said second switch;
wherein said voltage feedback loop includes a second comparator having one input that receives said output voltage, another input that receives a reference voltage, and an output, a flip-flop having a clock input, a clear input, a data output and an inverted data output, said clock input coupled to said output of said second comparator, and a delay loop coupled between said inverted data output and said clear input, wherein said delay loop provides a delay that corresponds to said predetermined time duration; and
an AND gate having one input coupled to said data output, another input that receives an inversion of said first comparator output, and having an output coupled to said control input of said first switch.

18. A system, comprising:
a power management apparatus including a switching device that provides a resistance between a power source terminal and an output terminal, said power source terminal having an input voltage, and said output terminal having an output voltage,
a voltage feedback loop coupled to said switching device and said output terminal, said voltage feedback loop configured to monitor said output voltage and selectively control said switching device based on said output voltage to increase said resistance for a predetermined time duration;
wherein said voltage feedback loop is configured to selectively generate a digital pulse of said predetermined time duration based on said output voltage, and wherein said resistance increases in response to said digital pulse, and
a load apparatus coupled to said output terminal to receive current via said switch device.

19. The system of claim 18, wherein said load apparatus is a computer apparatus.

* * * * *